United States Patent
Oross et al.

(10) Patent No.: US 7,331,134 B2
(45) Date of Patent: Feb. 19, 2008

(54) DEPLOYABLE LABEL DISPLAY SYSTEM

(75) Inventors: Glen A Oross, Corvallis, OR (US); Memphis Zhihong Yin, Corvallis, OR (US); Neal D Buchanan, Cheshire, OR (US); Robert P Bliven, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1331 days.

(21) Appl. No.: 10/000,423

(22) Filed: Oct. 31, 2001

(65) Prior Publication Data

US 2003/0145496 A1    Aug. 7, 2003

(51) Int. Cl.
*G09F 3/18* (2006.01)
(52) U.S. Cl. .............. 40/642.02; 40/657; 200/43.09; 361/683
(58) Field of Classification Search ............ 40/642.02, 40/657, 661.09, 336; 248/918; 200/43.04, 200/43.05, 43.06, 43.09, 43.07; 361/683
See application file for complete search history.

(56) References Cited

U.S. PATENT DOCUMENTS

| 1,465,244 | A | * | 8/1923 | Hager | 40/374 |
| 3,518,783 | A | * | 7/1970 | Foley | 40/336 |
| 3,991,495 | A | * | 11/1976 | Wilson | 40/375 |
| 4,142,312 | A | * | 3/1979 | Stokes | 40/336 |
| 5,513,456 | A | * | 5/1996 | Gleason | 40/358 |
| 5,700,051 | A | * | 12/1997 | Newhouse | 297/188.11 |
| 6,347,232 | B1 | * | 2/2002 | de Casillas | 40/336 |
| 6,431,512 | B1 | * | 8/2002 | Fox et al. | 248/286.1 |
| 6,532,691 | B2 | * | 3/2003 | Carlin et al. | 40/491 |
| 2002/0129527 | A1 | * | 9/2002 | Vaudreuil | 40/655 |

* cited by examiner

*Primary Examiner*—Gary C. Hoge

(57) ABSTRACT

A label display system includes a deployable label base to display labels, such as regulatory and/or certification marking labels, for an electronic and/or portable computing device. The deployable label base moves between a first position and a second position, where the labels are viewable in the first position, and where at least some of the labels are concealed from view in the second position. The deployable label base includes a first side to display labels and at least a second side to display labels. The deployable label base can be flexible and include or encase a security cable to secure the electronic and/or portable computing device.

38 Claims, 6 Drawing Sheets

DEPLOYABLE LABEL DISPLAY SYSTEM

TECHNICAL FIELD

This invention relates to electronic devices and, in particular, to displaying regulatory, certification marking, required, and/or information labels on portable electronic and computing devices.

BACKGROUND

The advances and convergence of computer and communication technologies has led to increased regulation, standardization, and testing and certification requirements for electronic and computing devices to ensure that the many available devices from various manufacturers do in fact communicate with each other and are technologically compatible. Standardization, along with testing and certification, ensures the interoperability of the many devices, guarantees the reliability of the devices and the technology, and prevents interference with other communication technologies.

Many countries that import electronic and computing devices require that various regulatory and certifying marks are attached to the devices before they can be shipped into their country. Several well-known independent organizations offer product testing, inspection, and conformity assessments for regulatory and certification approval. Such organizations that evaluate electronic and computing devices include Underwriters Laboratories Inc. (UL), CSA International, and the Nemko Group. CSA and UL are the predominate certification marks for electronic devices in the United States and Canada, and Nemko provides certification marks for Asian and European markets.

Underwriters Laboratories Inc., for example, has at least ten different electronic certifying marks, each having its own specific meaning and significance. The many variations of the UL mark (which is a "UL" enclosed in a circle) is commonly displayed on electrical and electronic devices, and on computer equipment. One such certifying mark associated with the convergence of computer and communication technologies is the international "emc-Mark" which appears on products meeting the electromagnetic compatibility requirements of Europe, the United States, Japan, Australia, or any combination of the four. In the United States, some types of products cannot be sold without proof of compliance to U.S. electromagnetic compatibility requirements. Such requirements include an electronic device's ability to operate in an electric environment without interfering with other electronic devices (emissions), and without being interfered by other devices in its vicinity (immunity). The types of products that are subject to EMC testing include computers, transmitters, and RF (radio frequency) components.

Limited space to display the many regulatory and certification markings, which are typically in the form of stick-on labels, is particularly a problem with portable computing devices such as a laptop computer or a PDA (personal digital assistant) where the physical size of the device limits the space needed to affix the labels to the devices. The number of required regulatory and certification markings continues to increase for wireless communications technologies such as RF (radio frequency), IR (infrared), Bluetooth, and IEEE specification 802.11. Bluetooth and specification 802.11 are examples of short-range wireless communication technologies that are integrated with computing devices.

In addition to the regulatory and certification markings, other information labels are also affixed to electronic and computing devices, such as barcodes, serial numbers, and similar product and/or component identifiers. The requirements to display these additional labels only exacerbate the problem of device exterior housing space limits for such labels. The following description discusses systems and methods to provide space to attach the ever increasing number of regulatory, certification marking, required, and/or identifier labels to electronic and computing devices when constrained to a limited space, such as with a portable computing device.

SUMMARY

A label display system includes a deployable label base to display labels, such as regulatory and/or certification marking labels, for an electronic and/or portable computing device. The deployable label base moves between a first position and a second position, where the labels are viewable in the first position, and where at least some of the labels are concealed from view in the second position.

The deployable label base includes a first side to display labels and at least a second side to display labels. The deployable label base can be rotated about an axis of the deployable label base such that the labels displayed on the first and second sides of the deployable label base are viewable. The deployable label base can also be flexible and include a security cable, or encase a security cable, to secure the electronic and/or portable computing device.

BRIEF DESCRIPTION OF THE DRAWINGS

The same numbers are used throughout the drawings to reference like features and components.

DETAILED DESCRIPTION

Introduction

The following describes systems and methods for a deployable label display system to display regulatory, certification marking, required, and/or information labels associated with portable electronic and computing devices. In many instances, such labels are required to evidence conformity with standardization and testing requirements.

Required labels can include those required by federal or state statute, those required by statute to preserve particular rights, such as a copyright, those required as evidence of testing and standardization, and any other such labels required by a particular country for import/export purposes. The label display system provides otherwise unavailable space to affix, or otherwise attach, these many labels to the devices.

In the described embodiments, an electronic device requiring the regulatory, certification marking, required, and/or information labels is illustrated and described as a portable computing device. However, aspects of the deployable label display system are applicable to other types of devices such as appliances, desktop computers, printers, and the many different types of mobile computing devices of varying sizes and designations. Such mobile computing devices include laptop computers, handheld computers, notebook computers, palm-sized computers, pocket computers, personal digital assistants, personal organizers, portable printers, and the like.

Figure 1:
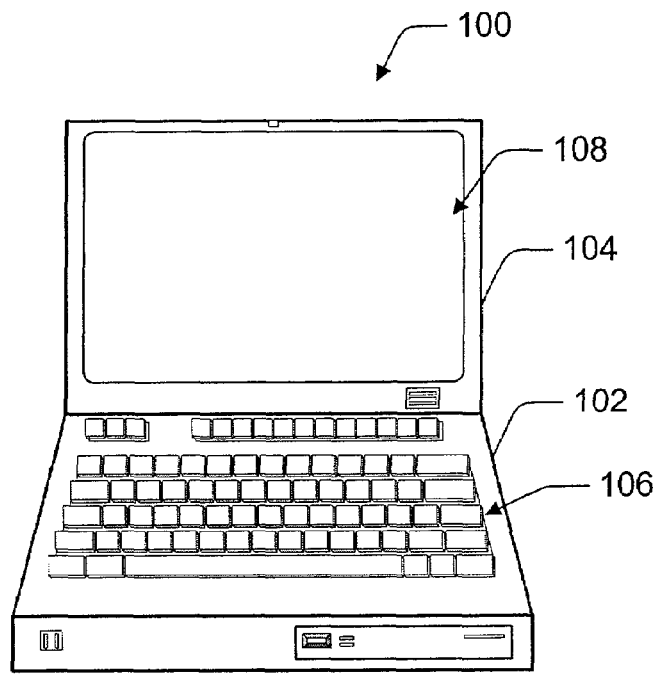
FIG. 1 illustrates a front-view of a portable computing device.

Although the context of this disclosure describes a portable computing device, aspects of the label display system are applicable to electronic and computing devices in general. The specific examples described in this disclosure are not meant to limit the scope of the claims or the description, but are meant to provide a specific understanding of the described implementations. ps Exemplary Portable Computing Device FIG. 1 illustrates a computing device 100, embodied in the form of a portable computer having a housing base 102 and a housing top 104. Housing base 102 and housing top 104 are coupled together via a hinge or other flexible joint (not shown) to permit housing top 104 to fold down over housing base 102. A keyboard assembly 106 is mounted within housing base 102 and a flat panel display 108 is mounted within housing top 104.

Exemplary Computer Architecture

Figure 2:
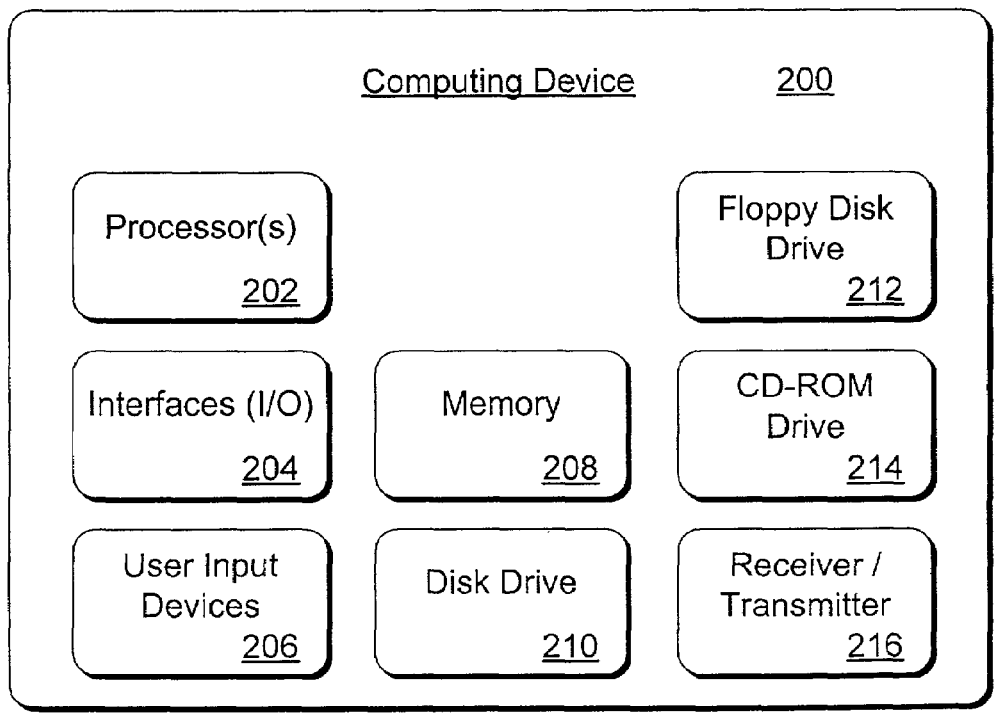
FIG. 2 is block diagram that illustrates various components of an exemplary computing device.

FIG. 2 illustrates various components of an exemplary computing device 200 that can be implemented as portable computing device 100 (FIG. 1). Computing device 200 includes one or more processors 202, interfaces 204 for inputting and outputting data, and user input devices 206. Processor(s) 202 process various instructions to control the operation of computing device 200, while interfaces 204 provide a mechanism for computing device 200 to communicate with other electronic and computing devices. User input devices 206 include a keyboard, mouse, pointing device, or other mechanisms for interacting with, and inputting information to computer 200.

Computing device 200 also includes a memory 208 (such as ROM and/or RAM), a disk drive 210, a floppy disk drive 212, and a CD-ROM drive 214. Memory 208, disk drive 210, floppy disk drive 212, and CD-ROM drive 214 provide data storage mechanisms for computing device 200. Although not shown, a system bus typically communicatively links the various components.

Computing device 200 also includes a receiver and/or transmitter 216 to communicatively link computing device 200 with other electronic and computing devices via a wireless communication link. Receiver and/or transmitter 216 can be configured for wireless communications technologies such as RF (radio frequency), IR (infrared), Bluetooth, and IEEE specification 802.11. For example, receiver and/or transmitter 216 can be implemented as a Bluetooth transceiver that both transmits and receives data.

Exemplary Deployable Label Display System

Figure 3:
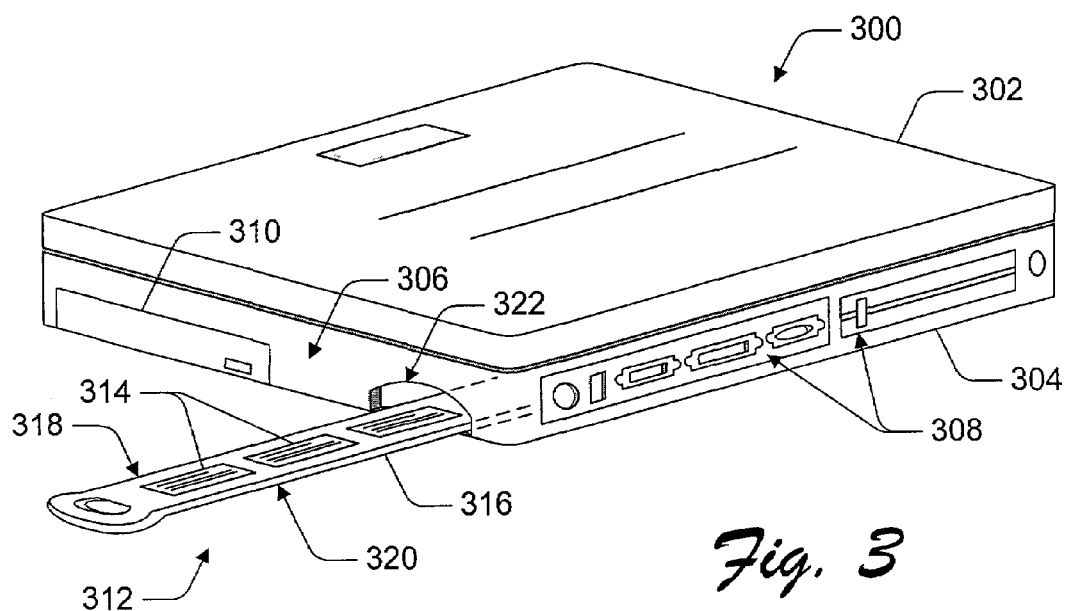
FIG. 3 illustrates a rear-view of a portable computing device with a deployable label display system.

FIG. 3 illustrates a portable computing device 300 with a housing top 302 folded down over a housing base 304. Computing device 300 is an example of a device that has very little available external housing space 306 to display regulatory, certification marking, required, and/or information labels (all commonly referred to herein as "labels") associated with the device. For example, computing device 300 includes various input/output interface modules 308 having various input/output connectors, and a component access compartment 310 for such components as a disk drive, CD-ROM drive, or batteries to power the device.

These, and other computing device components, limit the available external housing space 306 to affix, or otherwise attach, the labels which are typically stick-on labels. Other limitations and/or concerns with the increasing number of required regulatory, certification marking, required, and/or information labels is the cluttered appearance of the many labels on the device, and the space having to be allocated for the labels that would otherwise be utilized as grip areas for user convenience, and to vent heat generated by internal components of the device to an external of the device.

Computing device 300 includes a label display system 312 that provides otherwise unavailable space to affix, or otherwise attach, labels 314 to the device. Label display system 312 has a deployable label base 316 which has two sides 318 and 320. The first side 318 is shown as the top of deployable label base 316, and the second side 320 is shown as the bottom of deployable label base 316. Labels 314 can be affixed to both the first side 318 and the second side 320. Deployable label base 316 is slidable into and out of computing device 300 through an opening 322 in housing base 304.

Figure 4:
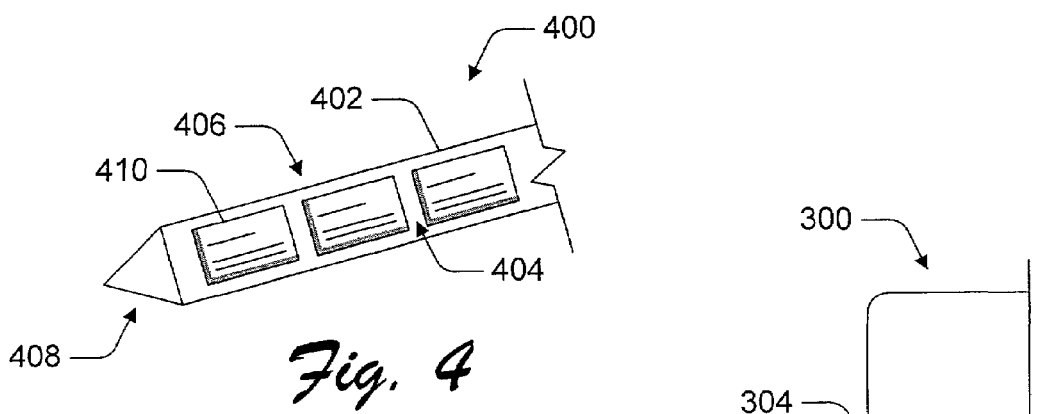
FIG. 4 illustrates a deployable label display system.

FIG. 4 illustrates an alternative label display system 400 having a deployable label base 402 with three sides 404, 406, and 408 to which labels, such as label 410, can be affixed or otherwise displayed. Label display system 400 can also be configured to be slidable into and out of computing device 300 through the opening 322 in housing base 304 (FIG. 3). Those skilled in the art will recognize that a label display system can be configured as one of any number of shapes and designs, some of which provide more space to affix or otherwise display labels, and some of which utilize only a minimal amount of space within the computing device housing base 304.

Figure 5:
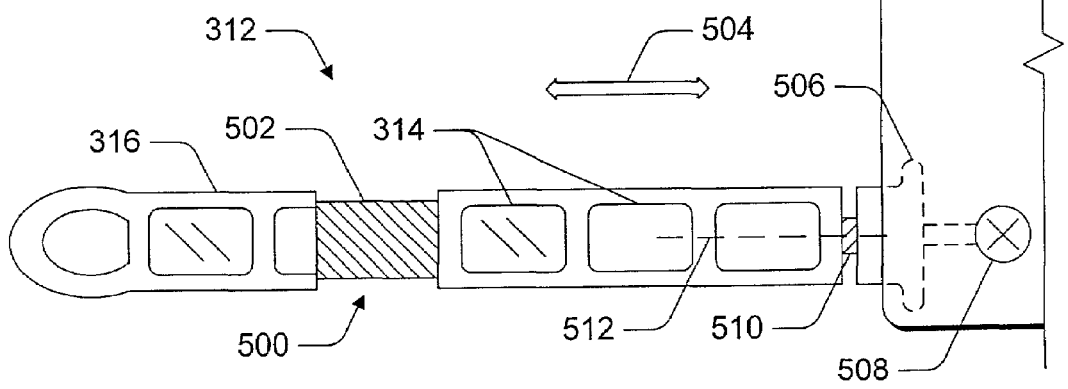
FIG. 5 further illustrates the deployable label display system shown in FIG. 3.

FIG. 5 further illustrates features of label display system 312 (FIG. 3). Deployable label base 316 can be constructed from any number of durable materials, such as a hard plastic, and have a surface that is suitable for stick-on type labels. A cutaway 500 of deployable label base 316 shows that deployable label base 316 can be constructed with a reinforced center 502 made from any number of durable materials such as Kevlar, metal, polycarbon, Mylar, or similar materials of sufficient durability.

Deployable label base 316 is slidable into and out of computing device 300 in directions indicated by arrows 504. In an extended position, as shown in FIG. 5, labels 314 are viewable. In a second position, which can be fully or partially retracted into computing device 300, at least some of the labels 314 are concealed from view by the computing system housing base 304. In the extended position, deployable label base 316 has a stop 506 that prevents the deployable label base from being removed from computing device 300.

A theft deterrent 508 is attached to, or otherwise integrated with, deployable label base 316 to render computing device 300 inoperable if the deployable label base is removed from the computing device. Those skilled in the art will recognize that theft deterrent 508 can be implemented as any number of devices, such as a switch or a disconnect, that disables computing device 300.

Deployable label base 316 includes a rotatable coupling 510 to rotate deployable label base 316 about a central longitudinal axis 512 of the deployable label base. When deployable label base 316 is in the extended position, and rotated about axis 512, the labels 314 on both sides 318 and 320 of the deployable label base are viewable.

It should be appreciated that the illustrated deployable label bases, such as deployable label base 316 (FIGS. 3 and 5) and deployable label base 402 (FIG. 4), are exemplary with respect to their size, shape, and relative size to computing device 300. Those skilled in the art will recognize that the illustrated deployable label bases can be larger or smaller relative to computing device 300, and that a deployable label base can be implemented as one of any number of shapes, sizes, and designs.

Figure 6:
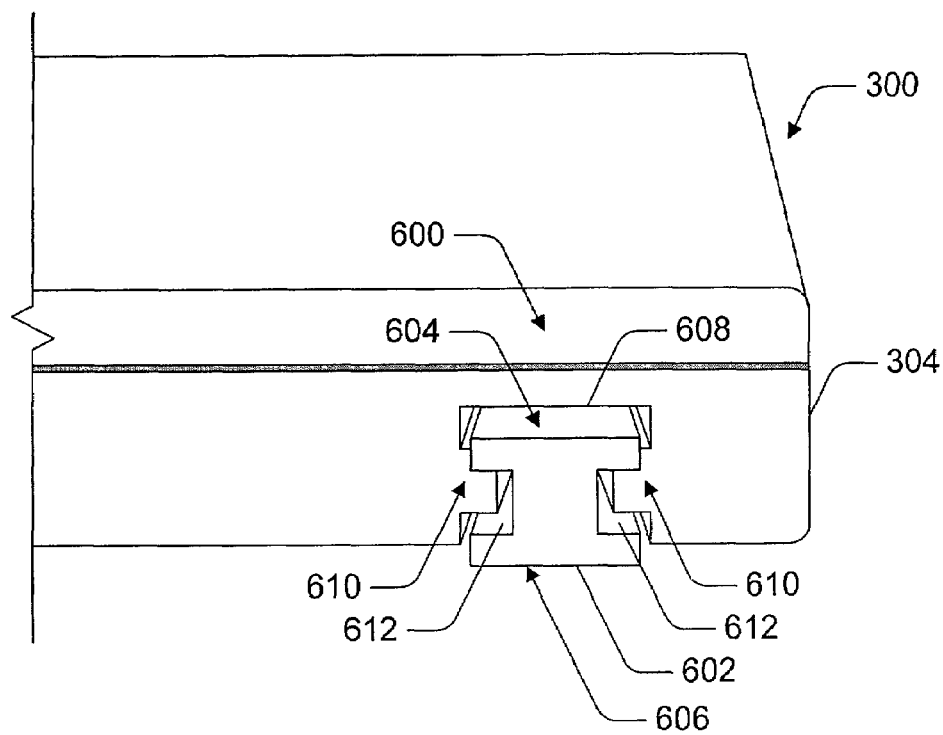
FIG. 6 illustrates a portable computing device with a deployable label display system.

FIG. 6 illustrates an alternative label display system 600 having a deployable label base 602 with two sides 604 and 606 to which labels can be affixed or otherwise displayed. Label display system 600 is slidable into and out of the computing device 300 via a channel 608 formed into housing base 304 (FIG. 3). Channel 608 has guides 610 that correlate to channels 612 in deployable label base 602. The channels 612 engage the guides 610 when the deployable label base 602 is moved into and out of computing device 300.

Figure 7:
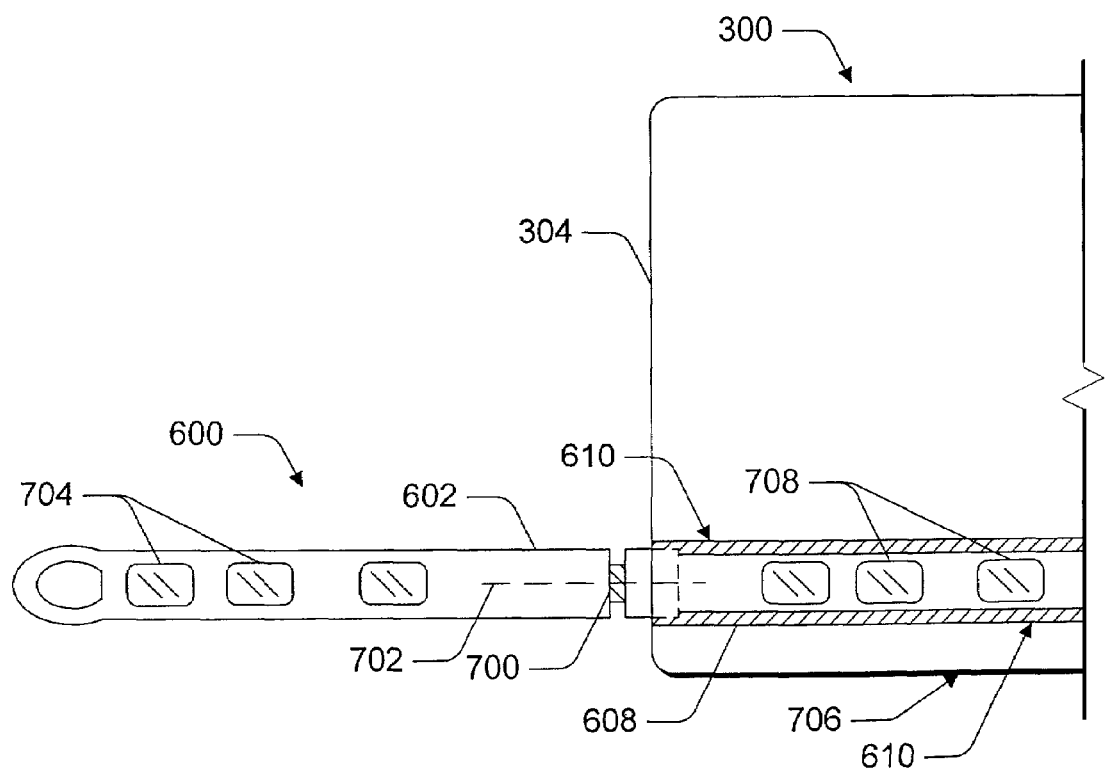
FIG. 7 further illustrates the deployable label display system shown in FIG. 6.

FIG. 7 further illustrates features of label display system 600 (FIG. 6). Deployable label base 602 includes a rotatable coupling 700 to rotate deployable label base 602 about a central longitudinal axis 702 of the deployable label base. When deployable label base 602 is in an extended position, as shown in FIG. 7, and rotated about axis 702, labels 704 on both sides 604 and 606 of the deployable label base are viewable.

Additionally, when deployable label base 602 is in the extended position, additional space 706 is provided to affix, or otherwise display, labels 708. Additional space 706 for labels 708 is the bottom (as viewed from the bottom of computing device 300 when turned over) of channel 608 which is formed into housing base 304. When deployable label base 602 is positioned to a second position, which can be fully or partially retracted into computing device 300, at least some of the labels 708 affixed in channel 608, and the labels on one side or the other of deployable label base 602, are concealed from view by the computing system housing base 304.

Figure 8:
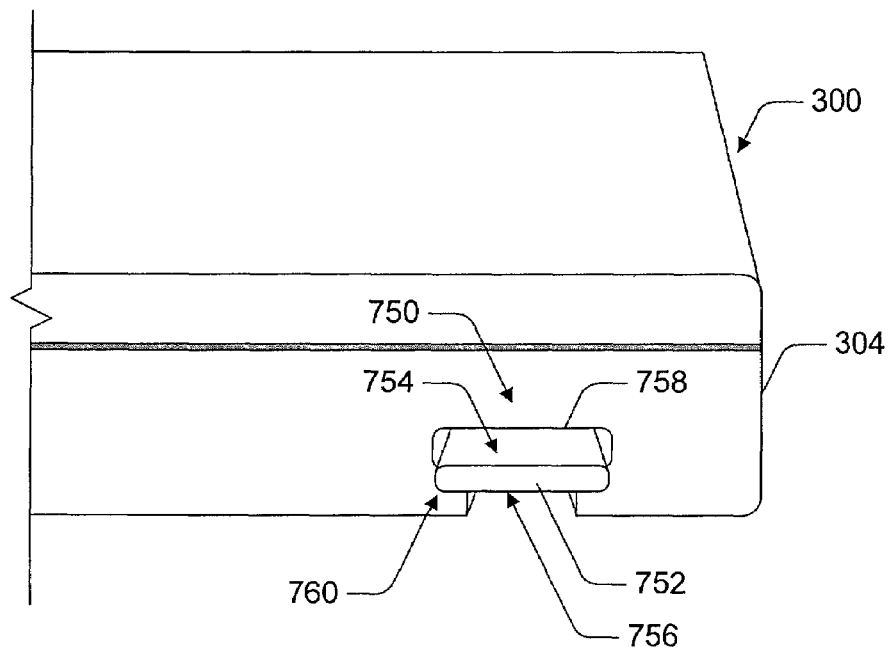
FIG. 8 illustrates a portable computing device with a deployable label display system.

FIG. 8 illustrates a label display system 750 which is an alternative to label display system 600 (FIG. 6), and takes up less space in the computing device housing base 304. Label display system 750 has a deployable label base 752 with two sides 754 and 756 to which labels can be affixed or otherwise displayed. Label display system 750 is slidable into and out of computing device 300 via a channel 758 formed into housing base 304. Channel 758 has guides 760 that deployable label base 752 slides on when moved into and out of computing device 300.

Figure 9:
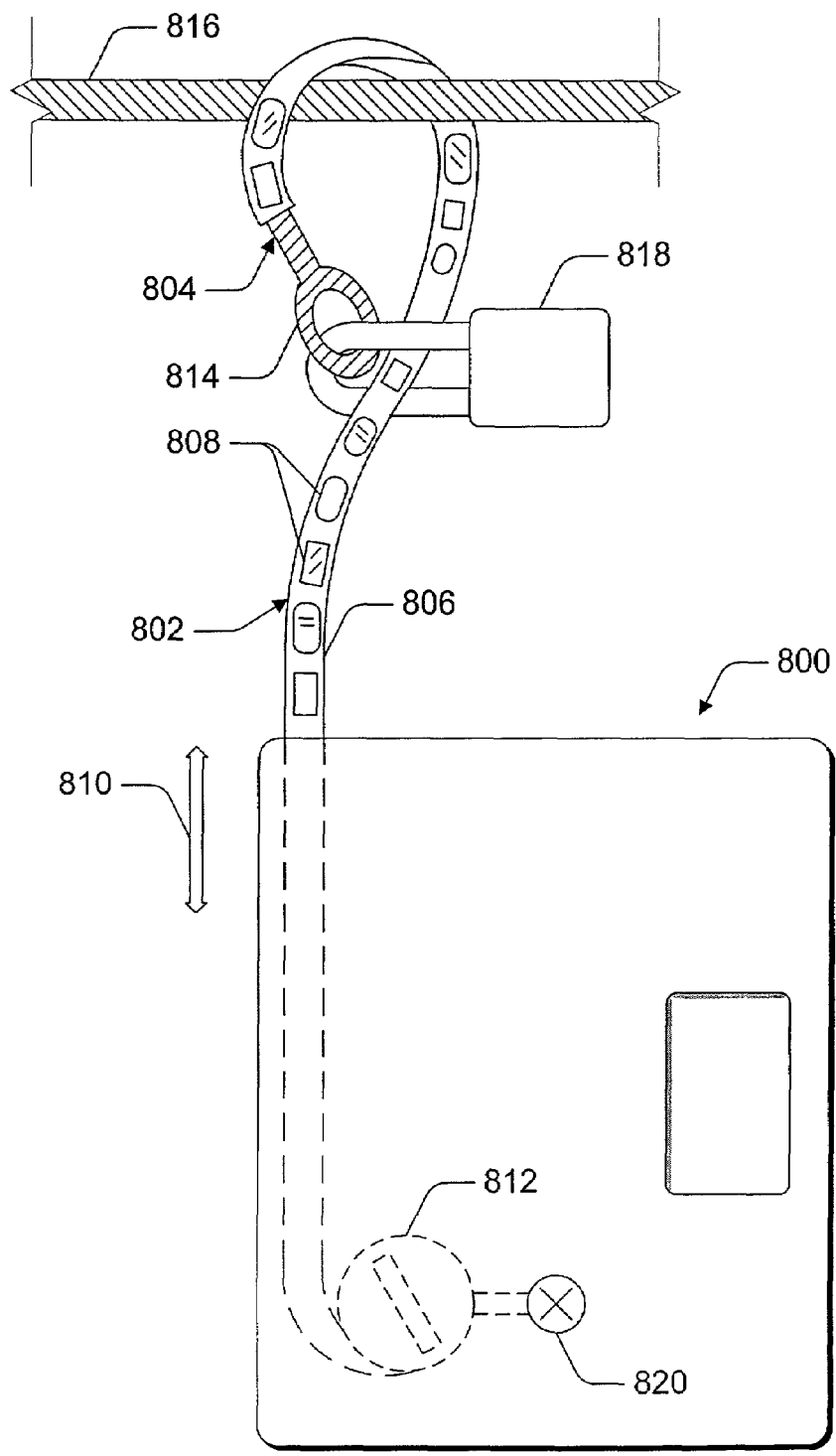
FIG. 9 illustrates a portable computing device with a deployable label display system integrated with a security cable system.

FIG. 9 illustrates a computing device 800 and a label display system 802 integrated with a security cable system 804. Label display system 802 has a deployable label base 806 to which labels 808 can be affixed or otherwise displayed. The deployable label base 806 is flexible and encases the security cable system 804. The deployable label base 806 and integrated security cable system 804 are spoolable into and out of computing device 800 in directions indicated by arrows 810. Computing device 800 includes a spooling mechanism 812 to take up and spool the deployable label base 806 and integrated security cable system 804.

Security cable system 804 includes a lock receptacle 814 to secure computing device 800 to an immovable object 816 with a lock 818. Additionally, a theft deterrent 820 is attached to, or otherwise integrated with, deployable label base 806 and/or security cable system 804 to render computing device 800 inoperable if the deployable label base or security cable is removed, or otherwise disconnected from, the computing device. Those skilled in the art will recognize that theft deterrent 820 can be implemented as any number of devices, such as a switch or a disconnect, that disables computing device 800.

Figure 10:
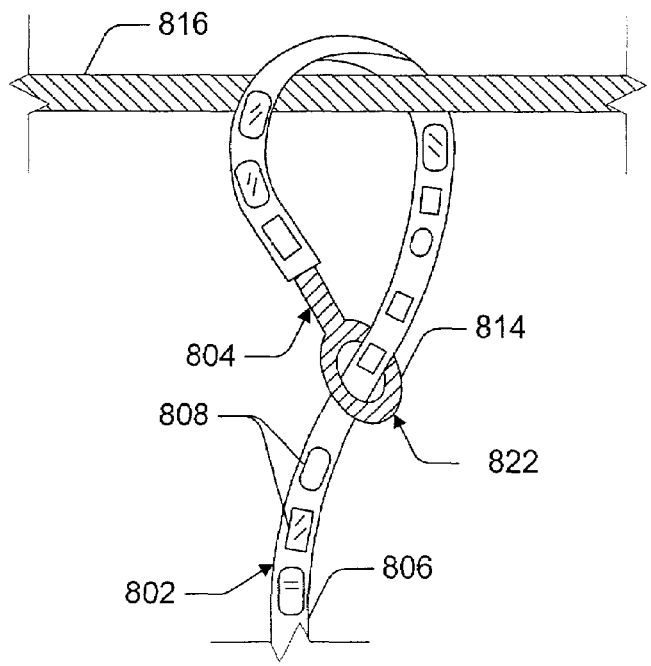
FIG. 10 further illustrates the deployable label display system integrated with a security cable system shown in FIG. 9.

FIG. 10 further illustrates label display system 802 integrated with the security cable system 804. Security cable system 804 includes a cable receptacle 822 that can be implemented as a cable locking device to secure computing device 800 (FIG. 9) to an immovable object 816. Those skilled in the art will recognize that cable receptacle 822 can be implemented as any number of integrated cable locking devices.

Methods for a Deployable Label Display System

Figure 11:
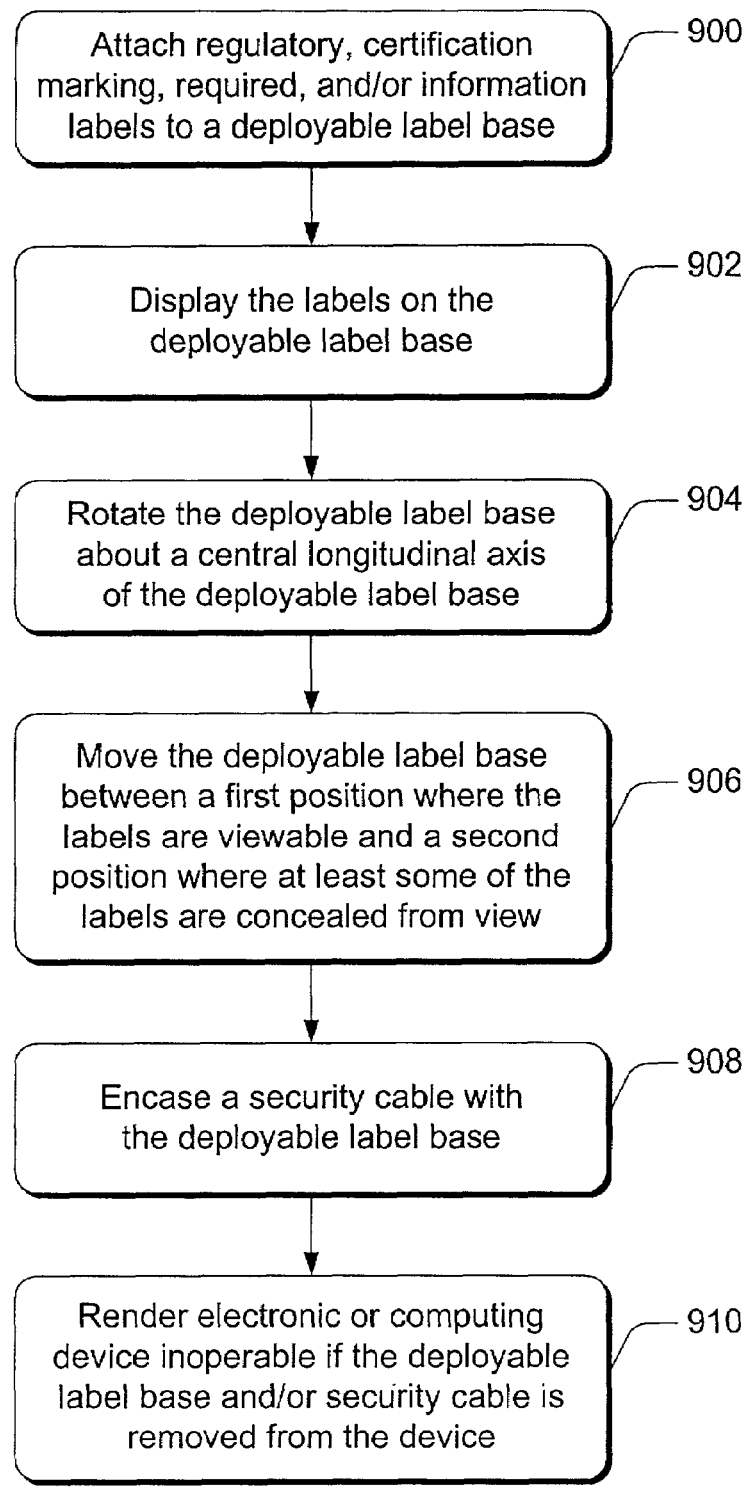
FIG. 11 is a flow diagram that describes a method for a deployable label display system.

FIG. 11 illustrates a method for a deployable label display system. The order in which the method is described is not intended to be construed as a limitation.

At block 900, labels are attached to a deployable label base. The labels can be regulatory, certification marking, required, and/or information labels pertaining to an electronic or computing device. Attaching the labels to the deployable label base includes attaching one or more of the labels to a first side of the deployable label base, and attaching one or more of the labels to at least a second side of the deployable label base.

At block 902, the labels for the electronic and/or computing device are displayed on the deployable label base. Displaying the labels includes displaying one or more of the labels on a first side of the deployable label base, and displaying one or more of the labels on at least a second side of the deployable label base.

At block 904, the deployable label base is rotated about a central longitudinal axis of the deployable label base. When rotating the deployable label base, the labels on the multiple sides of the deployable label base are viewable.

At block 906, the deployable label base is moved, such as by sliding it, between a first position and a second position. In the first position, the labels are viewable, and in the second position, at least some of the labels are concealed from view.

At block 908, a security cable is encased, or otherwise integrated with, the deployable label base. At block 910, the electronic or computing device is rendered inoperable if the deployable label base and/or security cable is removed from the device.

CONCLUSION

A deployable label display system provides space to affix and display regulatory, certification marking, required, and/or information labels associated with electronic and computing devices. The label display system has a deployable label base that can be extended to view the labels, or retracted from view.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A computing device, comprising:
   a portable computer;
   a deployable label base, attached to the portable computer, and configured to display labels associated with the portable computer; and
   a theft deterrent configured to render the portable computing device inoperable if the deployable label base is removed from the portable computing device;
   wherein the deployable label base is configured for movement between a first position and a second position, the labels being viewable in the first position and in the second position at least some of the labels are slid into the computing device, thereby concealing them from view.

2. A computing device as recited in claim 1, wherein the deployable label base includes a first side to display one or more of the labels and at least a second side to display one or more of the labels.

3. A computing device as recited in claim 1, wherein the deployable label base is configured to display regulatory labels.

4. A computing device as recited in claim 1, wherein the deployable label base is configured to display certification marking labels.

5. A computing device as recited in claim 1, wherein the deployable label base is further configured to rotate about a central longitudinal axis of the deployable label base.

6. A computing device as recited in claim 1, wherein the deployable label base is further configured to rotate about a central a longitudinal axis of the deployable label base in the first position.

7. A computing device as recited in claim 1, wherein the deployable label base includes a first side to display one or more of the labels and at least a second side to display one or more of the labels, and wherein the deployable label base is further configured to rotate about a central longitudinal axis of the deployable label base, the one or more labels on the first side and the one or more labels on the second side being viewable when the deployable label base is rotated.

8. A computing device as recited in claim 1, wherein the deployable label base is configured for slidable movement between the first position and the second position.

9. A computing device as recited in claim 1, wherein the deployable label base is flexible and further configured to be spooled in the second position.

10. A computing device as recited in claim 1, wherein the deployable label base includes a security cable configured to secure the portable computing device.

11. A computing device as recited in claim 1, wherein the deployable label base encases a security cable configured to secure the portable computing device.

12. A computing device as recited in claim 1, wherein the deployable label base encases a security cable configured to secure the portable computing device, and wherein the portable computing device is rendered inoperable if the security cable is removed from the portable computing device.

13. A label display system, comprising:
    a deployable label base configured to display required labels for an electronic device;
    the deployable label base configured for movement between a first position and a second position, wherein within the first position the labels are viewable and in the second position at least some of the labels are slid into the electronic device, thereby concealing them from view; and
    a theft deterrent configured to render the portable computing device inoperable if the deployable label base is removed from the portable computing device.

14. A label display system as recited in claim 13, wherein the deployable label base includes a first side to display one or more of the required labels and at least a second side to display one or more of the required labels.

15. A label display system as recited in claim 13, wherein the deployable label base is configured to display regulatory labels.

16. A label display system as recited in claim 13, wherein the deployable label base is configured to display certification marking labels.

17. A label display system as recited in claim 13, wherein the deployable label base is further configured to rotate about a central longitudinal axis of the deployable label base.

18. A label display system as recited in claim 13, wherein the deployable label base is further configured to rotate about a central longitudinal axis of the deployable label base in the first position.

19. A label display system as recited in claim 13, wherein the deployable label base is configured for slidable movement between the first position and the second position.

20. A label display system as recited in claim 13, wherein the deployable label base includes a security cable configured to secure the electronic device.

21. A label display system as recited in claim 13, wherein the deployable label base encases a security cable configured to secure the electronic device.

22. A label display system as recited in claim 13, wherein the deployable label base encases a security cable configured to secure the electronic device, and wherein the. electronic device is rendered inoperable if the security cable is removed from the electronic device.

23. A label display system, comprising:
    a deployable label base configured to display required labels for an electronic device;
    the deployable label base configured for movement between a first position and a second position, the labels being viewable in the first position and at least some of the labels being concealed from view in the second position; and
    a theft deterrent configured to render the portable computing device inoperable if the deployable label base is removed from the portable computing device;
    wherein the deployable label base is flexible.

24. A method, comprising:
    attaching labels for a portable computing device to a deployable label base;
    moving the deployable label base between a first position and a second position, wherein the labels are viewable in the first position and in the second position at least some of the labels are slid into the portable computing device, thereby concealing them from view; and
    rendering the portable computing device inoperable if the deployable label base is removed from the portable computing device.

25. A method as recited in claim 24, wherein attaching includes attaching one or more of the labels to a first side of the deployable label base, and attaching one or more of the labels to at least a second side of the deployable label base.

26. A method as recited in claim 24, wherein attaching includes attaching regulatory labels.

27. A method as recited in claim 24, wherein attaching includes attaching certification marking labels.

28. A method as recited in claim 24, further comprising rotating the deployable label base about a central longitudinal axis of the deployable label base.

29. A method as recited in claim 24, further comprising rotating the deployable label base about a central longitudinal axis of the deployable label base, and wherein attaching includes attaching one or more of the labels to a first side of the deployable label base, and attaching one or more of the labels to at least a second side of the deployable label base.

30. A method as recited in claim 24, further comprising sliding the deployable label base between the first position and the second position.

31. A method as recited in claim 24, further comprising encasing a security cable with the deployable label base.

32. A method as recited in claim 24, further comprising encasing a security cable with the deployable label base, and rendering the portable computing device inoperable if the security cable is removed from the portable computing device.

33. A method, comprising:
displaying required labels for an electronic device on a deployable label base;
moving the deployable label base between a first position and a second position, wherein the required labels are displayed in the first position and in the second position at least some of the required labels are slid into the electronic device, thereby concealing them from display; and
rendering the portable computing device inoperable if the deployable label base is removed, from the portable computing device.

34. A method as recited in claim 33, wherein displaying includes displaying one or more of the required labels on a first side of the deployable label base, and displaying one or more of the required labels on at least a second side of the deployable label base.

35. A method as recited in claim 33, wherein displaying includes displaying regulatory labels.

36. A method as recited in claim 33, wherein displaying includes displaying certification marking labels.

37. A method as recited in claim 33, further comprising encasing a security cable with the deployable label base.

38. A method as recited in claim 33, further comprising encasing a security cable with the deployable label base, and rendering the electronic device inoperable if the security cable is removed from the electronic device.

* * * * *

UNITED STATES PATENT AND TRADEMARK OFFICE
CERTIFICATE OF CORRECTION

PATENT NO.        : 7,331,134 B2  
APPLICATION NO.   : 10/000423  
DATED             : February 19, 2008  
INVENTOR(S)       : Glen A Oross et al.

Page 1 of 1

It is certified that error appears in the above-identified patent and that said Letters Patent is hereby corrected as shown below:

In the Claims

In column 7, line 35, in Claim 6, after "central" delete "a".

In column 8, line 38, in Claim 22, after "wherein the" delete ".".

In column 10, line 8, in Claim 33, after "removed" delete ",".

Signed and Sealed this
Eleventh Day of February, 2014

Michelle K. Lee
*Deputy Director of the United States Patent and Trademark Office*